UNITED STATES PATENT OFFICE.

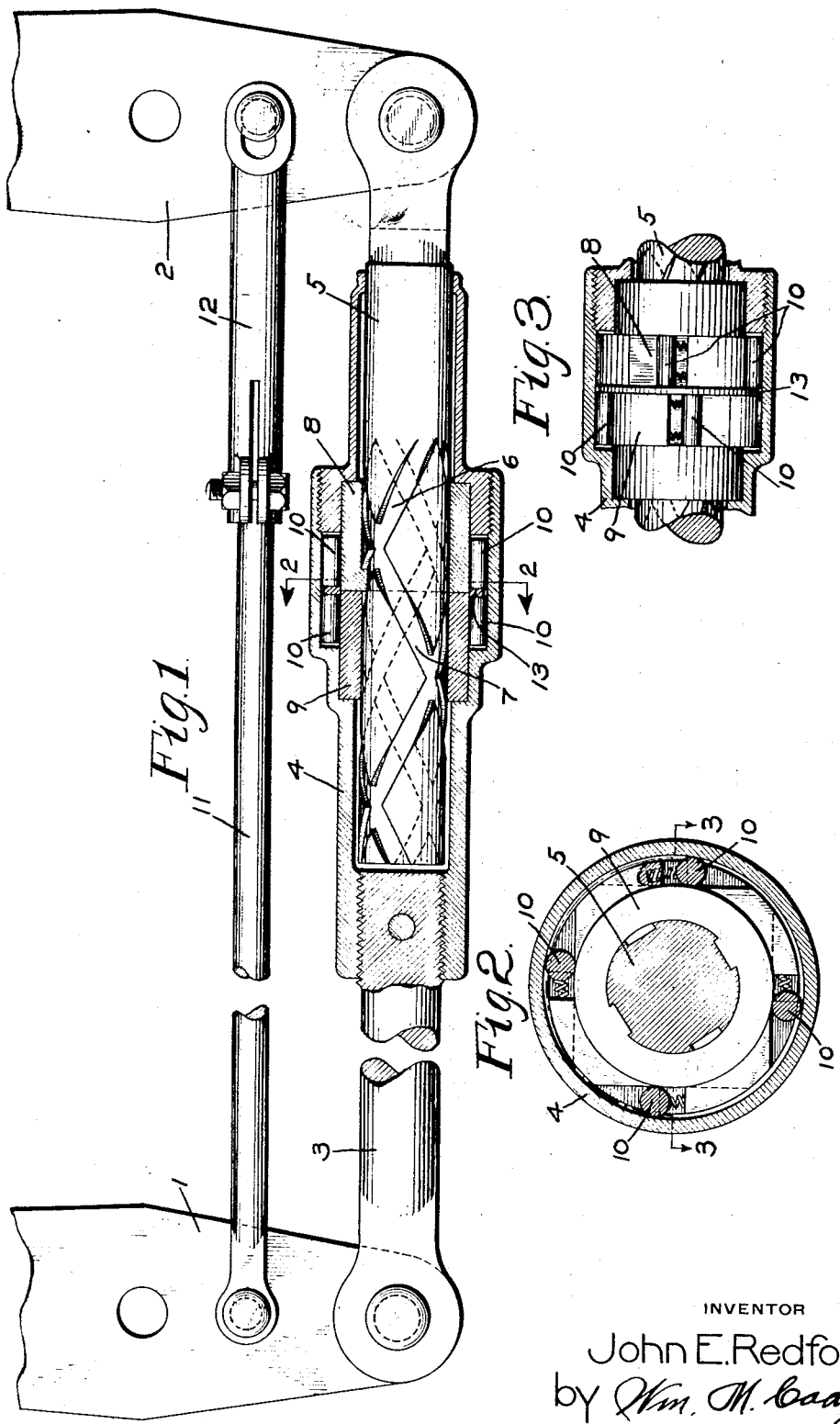
J. E. REDFORD.
BRAKE SLACK ADJUSTER.
APPLICATION FILED MAR. 14, 1919.
1,370,841. Patented Mar. 8, 1921.
INVENTOR
John E. Redford
by Wm. M. Cady
Att'y.

JOHN E. REDFORD, OF KINLOCH, MISSOURI, ASSIGNOR TO AMERICAN BRAKE COMPANY, OF ST. LOUIS, MISSOURI, A CORPORATION OF MISSOURI.

BRAKE SLACK-ADJUSTER.

1,370,841.  Specification of Letters Patent.  Patented Mar. 8, 1921.

Application filed March 14, 1919. Serial No. 282,665.

*To all whom it may concern:*

Be it known that I, JOHN E. REDFORD, a citizen of the United States, residing at Kinloch, in the county of St. Louis and State of Missouri, have invented new and useful Improvements in Brake Slack-Adjusters, of which the following is a specification.

This invention relates to automatic slack adjusters for railway brakes and has for its principal object to provide an improved device of the above character.

In the accompanying drawing, Figure 1 is a side elevation, partly in section, of an automatic brake slack adjuster embodying my invention; Fig. 2 a section on the line 2—2 of Fig. 1; and Fig. 3 a section on the line 3—3 of Fig. 2.

According to my invention, as shown in Fig. 1 of the drawing, the usual brake levers 1 and 2 are connected together by an adjustable member which takes the place of the usual bottom rod and comprises a rod 3 pivoted to lever 1 and having secured thereto a sleeve 4.

Within the sleeve 4 is a rod 5, pivotally connected to the lever 2 and provided preferably with right and left hand spiral grooves 6 and 7. A nut 8 engages the groove 6 and a nut 9 the groove 7. Each nut is provided with a plurality of notches, within which are mounted dogs 10, in the form of rollers.

The dogs 10 are arranged, so as to permit a free movement of the nut in one direction and adapted to wedge between the nut and the sleeve to prevent rotative movement of the nut in the opposite direction.

Arranged parallel with the adjusting member of the slack adjuster is a rod 11, pivotally connected to lever 1 and mounted in a sleeve 12 which is pivotally connected to lever 2.

The end portion of the sleeve 12 is slotted and is provided with a clamping bolt for pressing the sleeve into frictional engagement with the rod 11, so as to permit movement of the rod, when sufficient force is applied to overcome the frictional resistance to movement.

In operation, as the brake shoes wear, upon applying the brakes, the rod 11 will be pulled out of the sleeve 12 an amount in accordance with the wear of the brake shoes. When the brakes are then released, after the lost motion is taken up, due to the elongated slot at the pivotal connection of the rod 12 with lever 2, the members 11 and 12 act as a fulcrum rod and cause the further release movement of the brake levers to pull out the member 5. This movement is permitted by the free movement of the nuts 8 and 9 in the spiral grooves 6 and 7, the nuts rotating in opposite directions.

Upon again applying the brakes, the tendency of the nuts 8 and 9 to rotate in the reverse directions is prevented by the locking or wedging of the dogs 10 between the sleeve 4 and the nuts 8 and 9.

It will be evident that the above operation is repeated at each application of the brakes as the brake shoes wear down.

While the slack take up would operate with a single clutch nut, this would set up a tendency to rotate the member 5 in applying the brakes and thus exert an undesirable torsional stress on the member 5 and its connection with the lever 2.

By employing the reversely operating nuts, the member 5 is locked against the tendency to rotate.

A washer 13 may be interposed between the respective sets of dogs for the nuts 8 and 9, so as to prevent the dogs of one set from working over into the race of the other set.

Having now described my invention, what I claim as new, and desire to secure by Letters Patent, is:—

1. In an automatic slack adjuster, the combination with brake levers, of a member connecting said levers comprising a rod having a screw thread capable of rotating a member engaging the thread upon longitudinal movement of the rod and a sleeve containing said rod, a nut engaging the screw threads on the rod and means for locking the nut against rotation in one direction, said nut being rotated in the opposite direction by longitudinal movement of the rod upon releasing the brakes.

2. In an automatic slack adjuster, the combination with brake levers, of a member connecting said levers comprising a screw threaded rod and a sleeve containing said rod, a nut engaging the screw threads on the rod, means for locking the nut against rotation in one direction, and a rod member also connecting said levers and adapted to be extended against frictional resistance in the movement of the levers to apply the brakes and to act as a fulcrum for moving the screw threaded rod and rotating the nut upon movement of the levers to release the brakes.

3. In an automatic slack adjuster, the combination with brake levers, of an adjustable member connecting said rods comprising a sleeve and a rod working in said sleeve and provided with right and left hand screw threads, a nut engaging each screw thread, means for locking said nuts against movement in one direction, and means for effecting a relative movement between the sleeve and the rod upon movement of the brake levers in releasing the brakes.

In testimony whereof I have hereunto set my hand.

JOHN E. REDFORD.